Sept. 15, 1964          C. C. SMITH          3,148,474
REVOLVING WORM BAIT
Filed Feb. 7, 1962
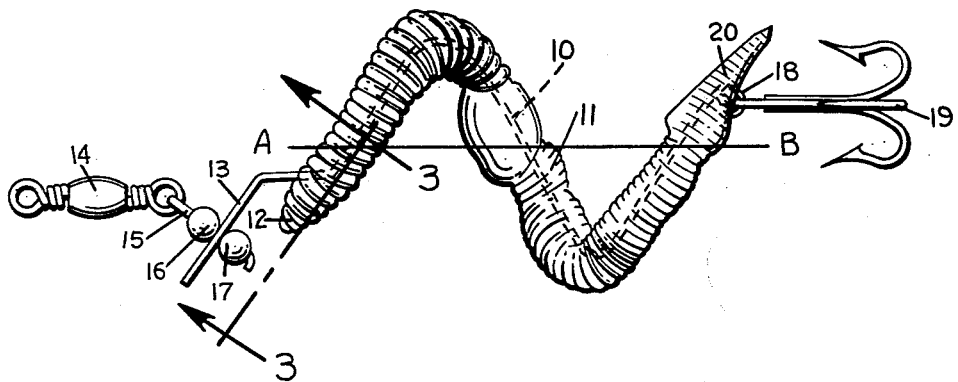
FIG.-1
FIG.-4
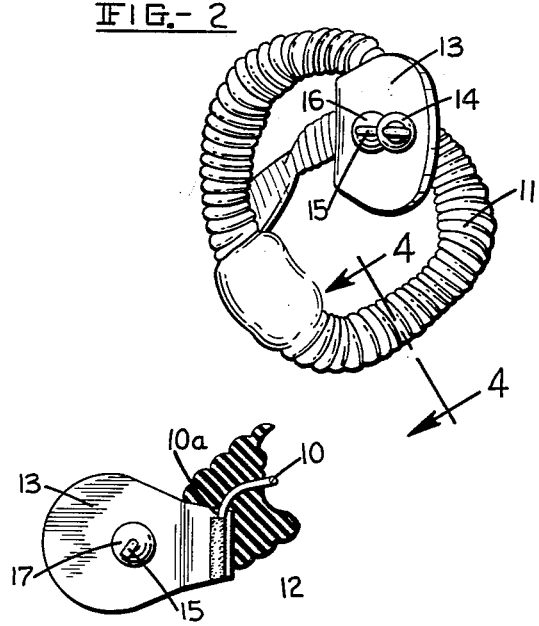
FIG.-2
FIG.-3
INVENTOR
CHARLES C. SMITH
BY Herbert A. Weinturn
ATTORNEY 3,148,474
REVOLVING WORM BAIT
Charles C. Smith, 14 N. Delaware, Indianapolis, Ind.
Filed Feb. 7, 1962, Ser. No. 171,615
1 Claim. (Cl. 43—42.24)

This invention relates to a fishing bait simulating a worm and which will revolve as it is pulled by a line through the water.

It is the purpose of the invention to provide such a bait which will remain distended in a more or less helical shape and be revolved by means of a blade angularly disposed in relation to the overall axis of the worm so that the bait will be extremely attractive by motion to fish.

A further important object of the invention is to provide a durable bait and one in which there are no hooks extending laterally from the simulated worm, and the bait carries only a gang of hooks at the tail end of the worm.

A still further important object of the invention is to provide a bait which will be durable over long periods of usage without becoming disintegrated or torn, and wherein the bait itself if it becomes distorted by striking logs or rocks and the like, may be readily reshaped and will remain in that shape unless some object is struck by it in casting and the like. It is not the intention or purpose to provide a bait wherein the "worm" part will vary in any appreciable extent as it is drawn through the water.

These and many other purposes and objects of the invention will become apparent to those versed in the art in the following description of one particular form, in which—

FIG. 1 is a view in side elevation of a bait embodying the invention;
FIG. 2 is a view in front end elevation;
FIG. 3 is a section on the line 3—3 in FIG. 1; and
FIG. 4 is a transverse view in section on the line 4—4 in FIG. 2.

A length of rather rigid wire 10 is shaped in the general form of an elongated helix, being limited to substantially one complete turn. On this wire is threaded an artificial, molded, soft body material 11 such as rubber or plastic which will have an external appearance in body of a worm such as a night crawler or the like.

The wire 10 protrudes from this body 11 adjacent the forward end 12, laterally from the body and is carried around to be fixed to a plate 13 which is positioned by the attached wire to be in a plane angularly disposed to one side of the axial line through the helix of the wire 10, and consequently of the worm body 11. The body end 12 terminates to one side of the axis generally designated by the line A—B in FIG. 1, and while its angle here is approximately forty-five degrees thereto, this angle may be varied by bending the wire in the zone where it emerges from the worm end 12.

Preferably a swivel connection 14 is engaged with the plate 13 by any suitable means, herein shown as by a length of wire 15 passing through a bead 16 on one side and a bead 17 on the other side of the plate 13. The line to which the bait is to be attached is connected with the swivel 14, the line not being herein shown.

The end of the wire 10 emerging from the tail end of the worm 11 is provided with an externally presented eye 18 to which a gang of hooks 19 is rockably connected in the usual manner. Preferably there is a small end portion 20 of the tail end of the worm 11 extending to one side of the eye 18.

In drawing the bait thus described, without the plate 13, the bait would simply be pulled through the water without any induced degree of revolution about its axis, and would be somewhat disconcerting to a fish. There is no contraction or expansion of the worm longitudinally of the axis A—B, and simulation of a worm traveling in the water is induced by reason of the presence of the plate 13 which as it is impressed against the water ahead of it in pulling the bait through the water, will tend to dart sideways, and in fact will make a complete path of rotation about the axis A—B due simply to the resistance of the water. In so turning, the worm will go through the water in a corkscrew fashion making a complete body roll on each revolution without setting up any noticeable bending of the supporting wire 10, so that the convolutions or turns of the body 11 will remain mostly constant, and the entire length of the body 11 will be made apparent to an observing fish.

The front wire end designated by the numeral 10a turns substantially radially of the axis A—B and has the plate 13 mounted on this radial extension to one side of the worm end 12. The swivel wire 15 passes through the plate 13 approximately at the center zone of the plate thereby inducing the revolution of the worm as above indicated.

While I have herein shown and described my invention in this one particular form, it is obvious that structural changes may be employed without departing from the spirit of the invention, and I therefore do not desire to be limited to that precise form beyond the limitations which may be imposed by the following claim.

I claim:
An artificial fish bait comprising
an approximately rigid wire having a generally helical form limited to approximately a single, elongated complete turn of a helix terminating by front and rear portions;
a soft, worm-like material simulating the body of a night crawler, centrally through which, said wire is threaded and covered by a major length of the wire;
terminal ends of said body extending unsupported one laterally from each of said wire end portions;
said wire front portion extending from said body by a length;
approximately radially from the axis of said helical form;
a planar plate fixed to said radial length and disposed to extend to one side of said axis;
means for connecting said plate to a fish line, said means being located at approximately the center zone of the plate; and
fish hook carrying means on said wire rear end presented externally of said body rear end.

References Cited in the file of this patent
UNITED STATES PATENTS
1,701,528   Clewell ---------------- Feb. 12, 1929
2,698,494   Larsen ----------------- Jan. 4, 1955
3,031,791   Banks ------------------ May 1, 1962

FOREIGN PATENTS
4,122   Great Britain ---------- Feb. 27, 1894